US012604149B2

(12) United States Patent
Kim et al.

(10) Patent No.: US 12,604,149 B2
(45) Date of Patent: Apr. 14, 2026

(54) ELECTRONIC DEVICE AND METHOD THEREOF FOR OUTPUTTING AUDIO DATA

(71) Applicant: SAMSUNG ELECTRONICS CO., LTD., Suwon-si (KR)

(72) Inventors: Kyumin Kim, Suwon-si (KR); Injune Choi, Suwon-si (KR); Misun Kim, Suwon-si (KR); Jaesung Ahn, Suwon-si (KR); Hyunil An, Suwon-si (KR); Hyojin Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 520 days.

(21) Appl. No.: 18/105,074

(22) Filed: Feb. 2, 2023

(65) Prior Publication Data

US 2023/0188919 A1 Jun. 15, 2023

Related U.S. Application Data

(63) Continuation of application No. PCT/KR2021/008671, filed on Jul. 7, 2021.

(30) Foreign Application Priority Data

Aug. 4, 2020 (KR) ........................ 10-2020-0097455

(51) Int. Cl.
*H04S 7/00* (2006.01)
*G10L 19/008* (2013.01)
(Continued)

(52) U.S. Cl.
CPC .............. *H04S 7/30* (2013.01); *G10L 19/008* (2013.01); *G10L 19/167* (2013.01); *H04R 5/02* (2013.01);
(Continued)

(58) Field of Classification Search
None
See application file for complete search history.

(56) References Cited

U.S. PATENT DOCUMENTS 6,311,161 B1 10/2001 Anderson et al.
7,912,728 B2 3/2011 Kong et al.
(Continued)

FOREIGN PATENT DOCUMENTS

CN 106686259 A 5/2017
CN 110415716 A 11/2019
(Continued)

OTHER PUBLICATIONS

Communication dated Oct. 20, 2021, issued by the International Searching Authority in counterpart International Application No. PCT/KR2021/008671 (PCT/ISA/210).
(Continued)

*Primary Examiner* — Duc Nguyen
*Assistant Examiner* — Assad Mohammed
(74) *Attorney, Agent, or Firm* — Sughrue Mion, PLLC

(57) ABSTRACT

An electronic device and method thereof for outputting audio data, the electronic device including: an audio module for outputting at least one of a piece of first audio data having a designated format or a piece of second audio data having a format different from the designated format; a memory configured to store instructions; and a processor configured to execute the instructions to: mix (hereinafter, first-mix) the at least one piece of second audio data, convert the first-mixed audio data into the designated format, mix (hereinafter, second-mix) the at least one piece of first audio data and the audio data converted into the designated format, post-process the second-mixed audio data; and transmit the post-processed audio data to the audio module to be output through the first sound output device.

16 Claims, 10 Drawing Sheets

(51) Int. Cl.

| | |
|---|---|
| ***G10L 19/16*** | (2013.01) |
| ***H04R 5/02*** | (2006.01) |
| ***H04R 5/04*** | (2006.01) |
| ***H04S 3/00*** | (2006.01) |

(52) U.S. Cl.

CPC ............... *H04R 5/04* (2013.01); *H04S 3/008* (2013.01); *H04R 2420/07* (2013.01); *H04S 2400/01* (2013.01)

(56) References Cited

U.S. PATENT DOCUMENTS

| | | | | |
|---|---|---|---|---|
| 7,976,392 | B2 | 7/2011 | Shimizu et al. | |
| 9,826,900 | B2 | 11/2017 | Heeren et al. | |
| 10,163,449 | B2 | 12/2018 | Purnhagen et al. | |
| 2008/0133224 | A1 | 6/2008 | Kong et al. | |
| 2008/0152319 | A1 | 6/2008 | Liang et al. | |
| 2009/0031419 | A1* | 1/2009 | Laksono | H04N 21/6175 726/21 |
| 2010/0070284 | A1 | 3/2010 | Oh et al. | |
| 2014/0358262 | A1 | 12/2014 | Yerrace et al. | |
| 2017/0093727 | A1 | 3/2017 | Chen et al. | |
| 2017/0300290 | A1* | 10/2017 | Hester | G11B 27/038 |
| 2019/0104424 | A1* | 4/2019 | Hariharan | H04L 1/1621 |
| 2021/0272574 | A1* | 9/2021 | Bruhn | H04S 3/008 |

FOREIGN PATENT DOCUMENTS

| | | | |
|---|---|---|---|
| JP | 3961185 | B2 | 8/2007 |
| JP | 4882783 | B2 | 2/2012 |
| JP | 6372268 | B2 | 8/2018 |
| KR | 10-0915116 | B1 | 9/2009 |
| KR | 10-1221919 | B1 | 1/2013 |
| KR | 10-2017-0038659 | A | 4/2017 |
| KR | 10-2019-0134821 | A | 12/2019 |
| WO | 2020/076708 | A1 | 4/2020 |

OTHER PUBLICATIONS

Communication dated Oct. 20, 2021, issued by the International Searching Authority in counterpart International Application No. PCT/KR2021/008671 (PCT/ISA/237).

Communication issued Oct. 29, 2024 by the Korean Patent Office for KR Patent Application No. 10-2020-0097455.

Communication issued Nov. 28, 2023 by the European Patent Office in European Patent Application No. 21854150.6.

Communication dated Jun. 24, 2025, issued by the European Patent Office in counterpart European Application No. 21854150.6.

* cited by examiner

ELECTRONIC DEVICE AND METHOD THEREOF FOR OUTPUTTING AUDIO DATA

CROSS-REFERENCE TO RELATED APPLICATIONS

This application is a by-pass continuation of International Application No. PCT/KR2021/008671, filed on Jul. 7, 2021, which is based on and claims priority to Korean Patent Application No. 10-2020-0097455, filed on Aug. 4, 2020, in the Korean Intellectual Property Office, the disclosures of which are incorporated by reference herein in their entireties.

BACKGROUND

1. Field

Various embodiments of the disclosure relate to an electronic device and a method thereof for outputting audio data.

2. Description of Related Art

Electronic devices (e.g., mobile terminals, smart phones, or wearable terminals) may support the output of audio signals (or audio data) having various formats (or resolutions). The format of an audio signal may include a sampling frequency (e.g., 44.1 Khz, 48 Khz, 96 Khz, 192 Khz, or 384 Khz), the number of quantization bits (e.g., 8 bits, 16 bits, 24 bits, or 32 bits), and/or the number of channels (e.g., 2 channels, 4 channels, 5.1 channels, 7.1 channels, or 8 channels).

An electronic device may output a game-related sound source by using a first format (e.g., 48 Khz, 16 bits, and 2 channels), output an mpeg-1 audio layer-3 (MP3) sound source by using a second format (e.g., 44.1 Khz, 16 bits, and 2 channels), and output an ultra-high quality audio (UHQA) sound source by using a third format (e.g., 192 Khz, 32 bits, and 2 channels).

The electronic device may mix, when outputting audio data having different formats (e.g., a sampling rate and/or the number of bits), the audio data having different formats, and convert (e.g., convert a sampling rate and/or the number of bits) the mixed audio data into a format supported by a sound output module (e.g., a Bluetooth audio device). For example, when mixing audio data having different formats, the electronic device may primarily convert a sampling rate of other audio data with reference to the highest sampling rate (hereinafter, a reference sampling rate) and then perform mixing, and secondarily convert the mixed audio data into a format supported by the sound output module.

In an electronic device, the output of an audio signal may be temporally delayed (e.g., a latency until the signal is reproduced through a sound output module) due to a plurality of conversion operations. For example, although an audio signal having the same format as a sound output module may be output through the sound output module without a separate conversion operation, the electronic device may perform primary conversion into a reference sampling rate and secondary conversion into the format of the sound output module, and then output an audio signal, so that output latency may occur. In the case of using an application which places importance on real-time responsiveness, such as a game, the output latency of the audio signal may cause inconvenience to a user.

In addition, with the recent increase in the use of a wireless sound output device (e.g., a Bluetooth device), more attention is being paid to a method capable of reducing output latency of an audio signal when a wireless sound output device is used.

SUMMARY

Various embodiments of the disclosure may provide an electronic device capable of reducing output latency of an audio signal and a method thereof for outputting audio data.

According to an aspect of the disclosure, an electronic device includes: an audio module configured to output, to at least one sound output device, at least one of at least one piece of first audio data having a designated format and at least one piece of second audio data having a format different from the designated format; at least one processor operatively connected to the audio module; and at least one memory operatively connected to the at least one processor and configured to store at least one instruction, wherein the at least one processor is configured to execute the at least one instruction to: generate first-mixed audio data by mixing (hereinafter, "first-mix") the at least one piece of second audio data; convert the first-mixed audio data into the designated format; generate second-mixed audio data by mixing (hereinafter, "second-mix") the at least one piece of first audio data and the first-mixed audio data converted into the designated format; post-process the second-mixed audio data; and transmit the post-processed second-mixed audio data to the audio module and cause the audio module to output the post-processed second-mixed audio data through the at least one sound output device.

The at least one processor may further include a main processor and an audio signal processor, and the main processor may be configured to transmit audio data having various formats to the audio signal processor, and the audio signal processor may be configured to generate processed audio data by performing at least one of format conversion, mixing, and post-processing to be performed on at least a part of the audio data having various formats received from the main processor, and to transmit the processed audio data to the audio module.

The at least one processor may be further configured to execute the at least one instruction to convert the first-mixed audio data into the designated format by converting a sampling rate of the first-mixed audio data into a sampling rate of the designated format.

The at least one processor is further configured to execute the at least one instruction to: determine whether the at least one piece of second audio data may include a plurality of pieces of second audio data; and based on the determining that the at least one piece of second audio data may include a plurality of pieces of second audio data, first-mix the at least one piece of second audio data by: identifying a sampling rate of each piece of second audio data of the plurality of pieces of second audio data, determining a highest sampling rate from among the identified sampling rates, for each respective piece of second audio data of the plurality of pieces of second audio data with a respective sampling rate that is not equal to the highest sampling rate from among the identified sampling rates, convert the respective sampling rate of the respective piece of second audio data into the highest sampling rate from among the identified sampling rates, and mixing the plurality of pieces of second audio data.

The at least one piece of first audio data may include audio data requiring low latency.

The at least one sound output device may include a wireless sound output device in communication with the electronic device via short-range wireless communication or a wired sound output device in communication with the electronic device via wired communication.

The short-range wireless communication may include Bluetooth communication, and the post-processing of the second-mixed audio data may include encoding.

The at least one processor may be further configured to execute the at least one instruction to: generate third-mixed audio data by mixing (hereinafter, "third-mix") the at least one piece of first audio data; convert the third-mixed audio data into a reference format; convert the at least one piece of second audio data into a reference format; generate fourth-mixed audio data by mixing (hereinafter, "fourth-mix") the third-mixed audio data converted into the reference format; post-process the fourth-mixed audio data; and transmit the post-processed fourth-mixed audio data to the audio module and cause the audio module to output the post-processed fourth-mixed audio data through a second sound output device.

The at least one processor may be further configured to execute the at least one instruction to: determine whether the second sound output device supports the reference format, and based on determining that the second sound output device does not support the reference format, convert the fourth-mixed audio data into a format supported by the second sound output device.

The at least one processor may be further configured to execute the at least one instruction to: generate fifth-mixed audio data by mixing (hereinafter, "fifth-mix") the at least one piece of first audio data; convert the fifth-mixed audio data into a reference format; convert the at least one piece of second audio data into the reference format; generate sixth-mixed audio data by mixing (hereinafter, "sixth-mix") the fifth-mixed audio data converted into the reference format; convert the sixth-mixed audio data into a format supported by the at least one sound output device, encode the converted sixth-mixed audio data, and cause the audio module to output the encoded audio data through the at least one sound output device; and convert the sixth-mixed audio data into a format supported by a second sound output device, post-process the converted sixth-mixed audio data, and cause the audio module to output the post-processed audio data through the second sound output device.

According to an aspect of the disclosure, a method for outputting audio data of an electronic device includes: generating first-mixed audio data by mixing (hereinafter, "first-mixing") at least one piece of second audio data; converting the first-mixed audio data into a designated format; generating second-mixed audio data by mixing (hereinafter, "second-mixing") at least one piece of first audio data and the fixed-mixed audio data converted into the designated format; post-processing the second-mixed audio data; and outputting the post-processed second-mixed audio data through at least one sound output device.

The converting of the first-mixed audio data into the designated format may include converting a sampling rate of the first-mixed audio data into a sampling rate of the designated format.

The first-mixing the at least one piece of second audio data may include: determining whether the at least one piece of second audio data may include a plurality of pieces of second audio data; and based on the determining that the at least one piece of second audio data may include a plurality of pieces of second audio data, first-mixing the at least one piece of second audio data by: identifying a sampling rate of each piece of second audio data of the plurality of pieces of second audio data, determining a highest sampling rate from among the identified sampling rates, for each respective piece of second audio data of the plurality of pieces of second audio data with a respective sampling rate that is not equal to the highest sampling rate from among the identified sampling rates, convert the respective sampling rate of the respective piece of second audio data into the highest sampling rate from among the identified sampling rates, and mixing the plurality of pieces of second audio data.

The at least one piece of first audio data may include audio data requiring low latency.

The at least one sound output device may include a wireless sound output device in communication with the electronic device via short-range wireless communication or a wired sound output device in communication with the electronic device via wired communication.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
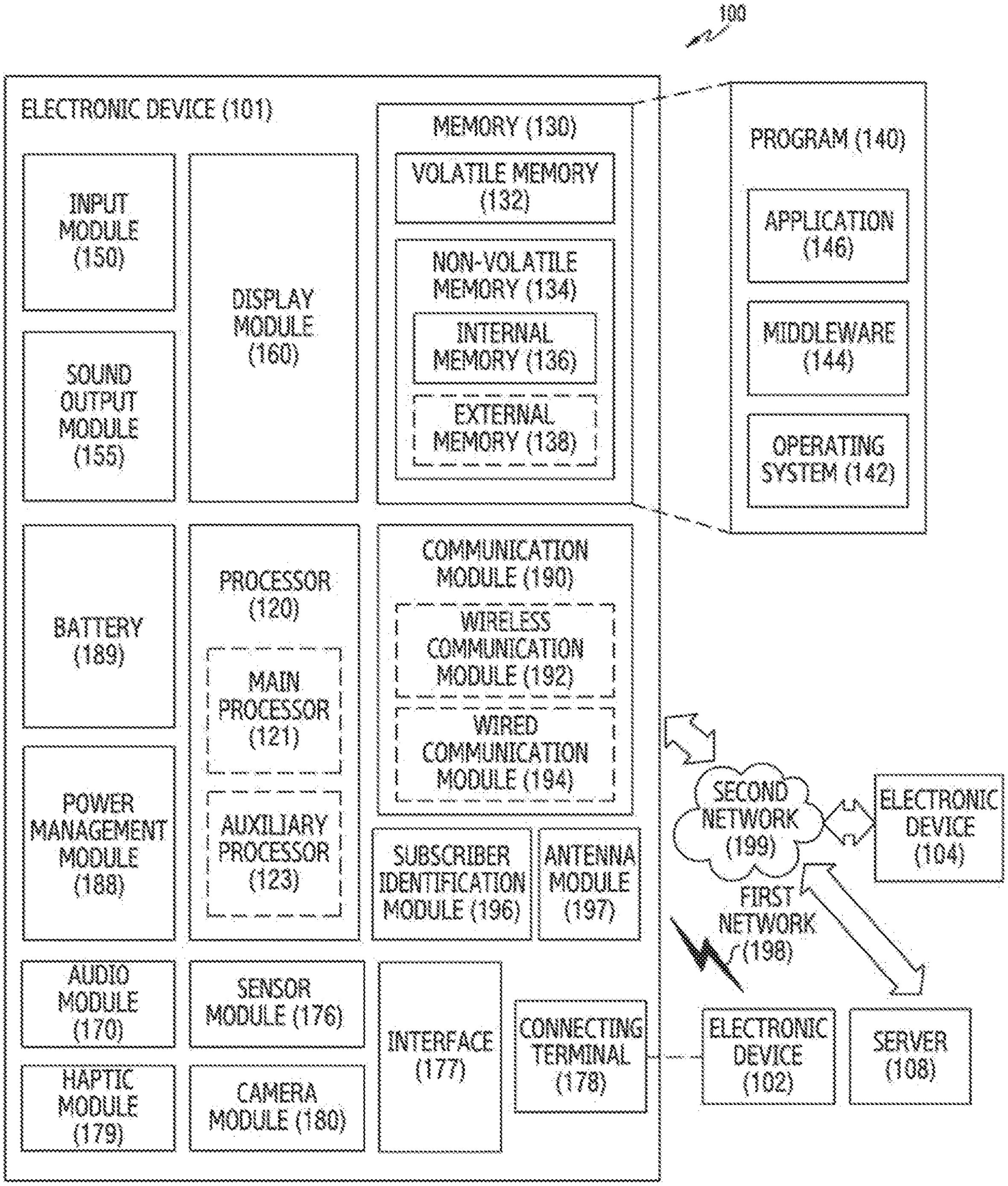
FIG. 1 is a block diagram of an electronic device in a network environment according to an embodiment of the disclosure.

Hereinafter, various embodiments of the disclosure will be described with reference to the accompanying drawings. In this document, specific embodiments are illustrated in the drawings and the related detailed descriptions are provided, but this is not intended to limit various embodiments of the disclosure to a specific form. For example, it is obvious to those skilled in the art to which the disclosure belongs that embodiments of the disclosure can be variously changed.

FIG. 1 is a block diagram illustrating an electronic device 101 in a network environment 100 according to various embodiments.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module(SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thererto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an intemet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
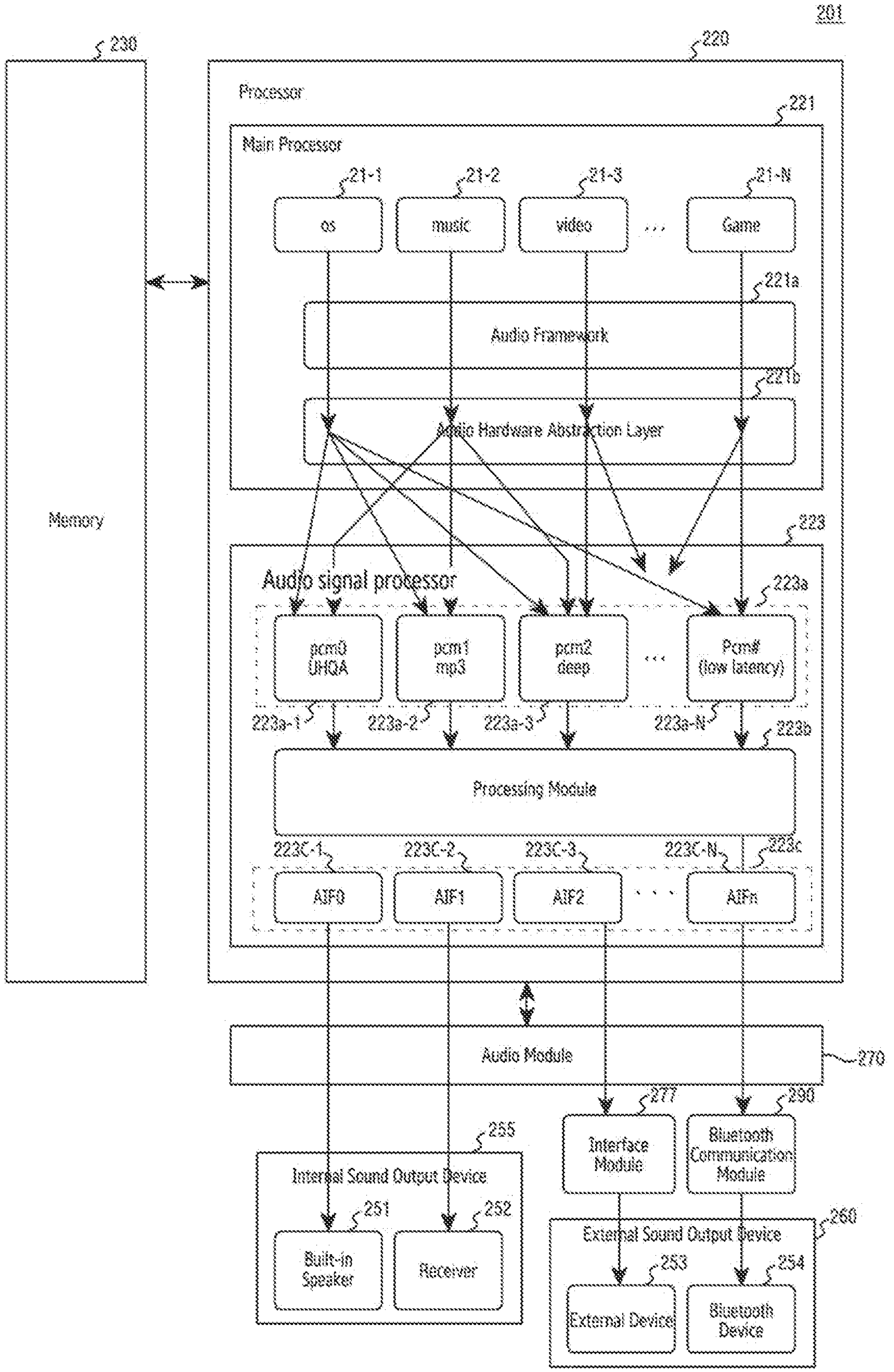
FIG. 2 is a block diagram illustrating a configuration of an electronic device according to another embodiment of the disclosure.

FIG. 2 is a block diagram illustrating a configuration of an electronic device according to another embodiment of the disclosure.

Referring to FIG. 2, an electronic device 201 (e.g., the electronic device 101) according to another embodiment of the disclosure may include a processor 220 (e.g., the processor 120 of FIG. 1), an audio module 270 (e.g., the audio module 170 of FIG. 1), a memory 230 (e.g., the memory 130 of FIG. 1), an internal sound output device 255 (e.g., the sound output module 155 of FIG. 1), an interface module 277 (e.g., the interface 177 of FIG. 1), and a Bluetooth communication module 290 (e.g., the wireless communication module 192 of FIG. 1).

According to an embodiment, the processor 220 (e.g., an application processor) may include a main processor 221 (e.g., the main processor 121 of FIG. 1) and an audio signal processor 223 (e.g., the coprocessor 123 of FIG. 1).

According to an embodiment, the main processor 221 (e.g., the main processor 121 of FIG. 1) may load a program (e.g., the program 140) including an application (e.g., a system (an operating system (OS)) 21-1 (e.g., an application which plays a system-related sound source), a music playback application 21-2, a video playback application 21-3, and/or a game application 21-N), an audio framework **221*a*, and an audio hardware abstraction layer (HAL) 221*b* in a designated address area of a memory (e.g., the memory 130 of FIG. 1 or the volatile memory 132 of FIG. 1**), and execute the program.

According to an embodiment, the audio signal processor 223 (e.g., the coprocessor 123 of FIG. 1) may load a program (e.g., the program 140) including a modulation module **223*a*, a processing module 223*b*, and an audio interface 223*c* in a designated address area of the memory (e.g., the memory 130 of FIG. 1 or the volatile memory 132 of FIG. 1**), and execute the program.

According to various embodiments, audio stream data generated (or loaded) in a memory space of the main processor 221 by the main processor 221 may be moved (e.g., copied) to a memory space of the audio signal processor 223 according to a direct memory access (DMA) scheme (for example, according to the control of a DMA controller included in the processor 220). As another example, the audio stream data may be moved (e.g., copied) to the memory space of the audio signal processor 223 via various communication schemes (e.g., a shared memory inter-processor communication (IPC) scheme) using a shared memory allocated to the memories 130 and 132, and transmitted.

According to an embodiment, the main processor 221 may transmit at least one piece of audio data requested to be output by at least one of applications (e.g., the system 21-1, the music playback application 21-2, the video playback application 21-3, and/or the game application 21-N) to the audio signal processor 223. For example, the main processor 221 may transmit the requested at least one piece of audio data to the audio signal processor 223 through the audio framework **221*a* and the audio hardware abstraction layer 221*b*. The audio framework 221*a* may select a sound output device which is to output audio data. The audio framework 221*a* may convert audio data to be output into audio stream data. The audio hardware abstraction layer 221*b* may receive information on the sound output device selected by the audio framework 221*a*, and control the selected sound output device. The audio hardware abstraction layer 221*b*** may control an output of audio data, based on audio data information (e.g., a sampling rate, the number of bits, the number of channels, and the size of audio stream), requirements of an application, and/or information on the selected sound output device.

According to an embodiment, at the time of transmitting at least one piece of audio data (or audio stream data), the main processor 221 may classify the audio data according to formats (or sizes) and transmit the classified audio data to the audio signal processor 223. The format of audio data may include a sampling frequency (e.g., 44.1 Khz, 48 Khz, 96 Khz, 192 Khz, or 384 Khz) and the number of quantization bits (e.g., 8 bits, 16 bits, 24 bits, or 32 bits). According to some embodiments, the format of an audio signal may further include the number of channels (e.g., 2 channels, 4 channels, 5.1 channels, 7.1 channels, or 8 channels).

According to some embodiments, the main processor 221 may classify audio data according to requirements of an application and transmit the classified audio data to the audio signal processor 223. For example, at the time of transmitting audio data, an application may transmit information indicating requirements (e.g., low latency and large capacity) for the audio data together. The main processor 221 may classify audio data according to requirements and transmit the classified audio data to the audio signal processor 223.

According to some embodiments, the main processor 221 may classify audio data, based on the format of the audio data and requirements of an application, and transmit the classified audio data to the audio signal processor 223. Hereinafter, for convenience of description, classification of audio data according to formats will be described as an example.

According to an embodiment, the main processor 221 may transmit audio data having a first format (e.g., UHQA) to a first node **223*a*-1 of the audio signal processor 223, transmit audio data having a second format (e.g., mp3) to a second node 223*a*-2, transmit audio data (e.g., audio data included in a video of 24 bits and 48 khz) having a third format (e.g., deep) to a third node 223*a*-3, and transmit audio data having an Nth format (e.g., low latency) to an Nth node 223*a*-N. The audio data having the Nth format is audio data requiring low latency and may have a designated format (e.g., 48 khz and 16 bit). The audio data having the Nth format may include, for example, touch sound-related audio data, notification sound-related audio data, game-related audio data, virtual reality-related audio data, or augmented reality-related audio data. For example, the main processor 221 may classify audio data generated (requested to be output) by a game application as low-latency audio data, and transmit the audio data to the Nth node 223*a*-N of the audio signal processor 223**.

According to an embodiment, the first node **223*a*-1 to the Nth node 223*a*-N may be modulation modules (e.g., pulse code modulation (PCM) modules). The first node 223*a*-1 to the Nth node 223*a*-N may include a buffer for transmitting audio stream data. The first node 223*a*-1 may have a large size so as to process audio stream data of high quality (or high resolution), the second node 223*a*-2 may have a medium size so as to process audio stream data of medium quality, the third node 223*a*-3 may process long-time audio stream data and have a large size to be resistant to buffer underrun, and the Nth node 223*a*-N may have a small size so as to quickly process short audio stream data. The Nth node 223*a***-N may support a limited format (e.g., 48 Khz and 16 bits).

The main processor 221 according to an embodiment may perform a control to output audio data through at least one of multiple sound output devices (e.g., a built-in speaker, a receiver, a wired ear set, a wired speaker, a Bluetooth ear set, or a Bluetooth speaker). The main processor 221 may control the audio signal processor 223 to differently configure internal configurations of the audio signal processor 223 according to the type of a sound output device configured (or determined) to output audio data. For example, the main processor 221 may transmit, to the audio signal processor 223, configuration information defining how to connect (or configure) at least a part of multiple internal configurations (e.g., at least one node, at least one mixing module, at least one conversion module, at least one post-processing module, and/or at least one audio interface) included in the audio signal processor 223 according to the type of a sound output device determined (selected) to output audio data, so as to configure the audio signal processor 223 to process audio data according to the configuration information. The configuration information may be stored in the memory 230 or a memory included in the processor 220 or the main processor 221. The detailed descriptions of configuration examples of the multiple processing modules will be described with reference to FIGS. 3A to 4C.

According to an embodiment, the audio signal processor 223 may process (e.g., modulation, mixing, conversion, post-processing) audio data received from the main processor 221 and then transmit the audio data to the audio module 270. For example, the audio signal processor 223 may process audio data received through the multiple nodes **223*a*-1 to 223*a*-N through the processing module 223*b*, and transmit the processed audio data to the audio module 270 through at least one of audio interfaces (AIFs) 223*c*-1, 223*c*-2, 223*c*-3, and 223*c*-N. For example, when the audio signal processor 223 is configured to output audio data to a built-in speaker 251, the audio signal processor may transmit the processed audio data to the audio module 270 through a first audio interface 223*c*-1, when the audio signal processor is configured to output audio data to a receiver 252, the audio signal processor may transmit the processed audio data to the audio module 270 through a second audio interface 223*c*-2, when the audio signal processor is configured to output audio data to an external device 253, the audio signal processor may transmit the processed audio data to the audio module 270 through a third audio interface 223*c*-3, and when the audio signal processor is configured to output audio data to a Bluetooth device 254 (e.g., a Bluetooth ear set or a Bluetooth speaker), the audio signal processor may transmit the processed audio data to the audio module 270 through an Nth audio interface 223*c***-N.

According to an embodiment, under the control of the main processor 221, the audio signal processor 223 may adaptively configure internal configurations of the processing module **223*b* so as to reduce a conversion operation (e.g., conversion of a sampling rate and/or the number of bits) for at least one piece of audio data having the same format as that of a sound output device among audio data to be output. The detailed description thereof will be described later with reference to FIGS. 3A to 4**C.

According to an embodiment, the audio module 270 may process audio data received from the audio signal processor 223 and transmit the processed audio data to the internal sound output device 255 (e.g., the built-in speaker 251 or the receiver 252), or an external sound output device 260 (e.g., the external device 253 or the Bluetooth device 254). The external device 253 may include a speaker or an earphone which is connected to the electronic device 201 by wire (e.g., a universal serial bus (USB) or an ear jack) through the interface module 277. The Bluetooth device 254 may be wirelessly connected to the electronic device 201 through the Bluetooth communication module 290.

According to an embodiment, when the audio module 270 is configured to output audio data to the internal sound output device 255 (e.g., the built-in speaker 251 or the receiver 252), the audio module may convert and/or amplify digital audio data into an analog signal to transmit the analog signal to the internal sound output device 255. As another example, when the audio module 270 is configured to output audio data to the external sound output device 260 (e.g., the external device 253 or the Bluetooth device 254 (e.g., a Bluetooth ear set or a Bluetooth speaker)), the audio module may transmit digital audio data to the external sound output device 260 through the interface module 277 or the Bluetooth communication module 290.

According to an embodiment, the audio module 270 may be included in the sound output device 255.

According to an embodiment, the memory 230 may be operatively connected to the processor 220 and may store instructions which, when executed, cause the processor 220 to adaptively control an output of audio data, based on a sound output device determined to output the audio data.

Figure 3A:
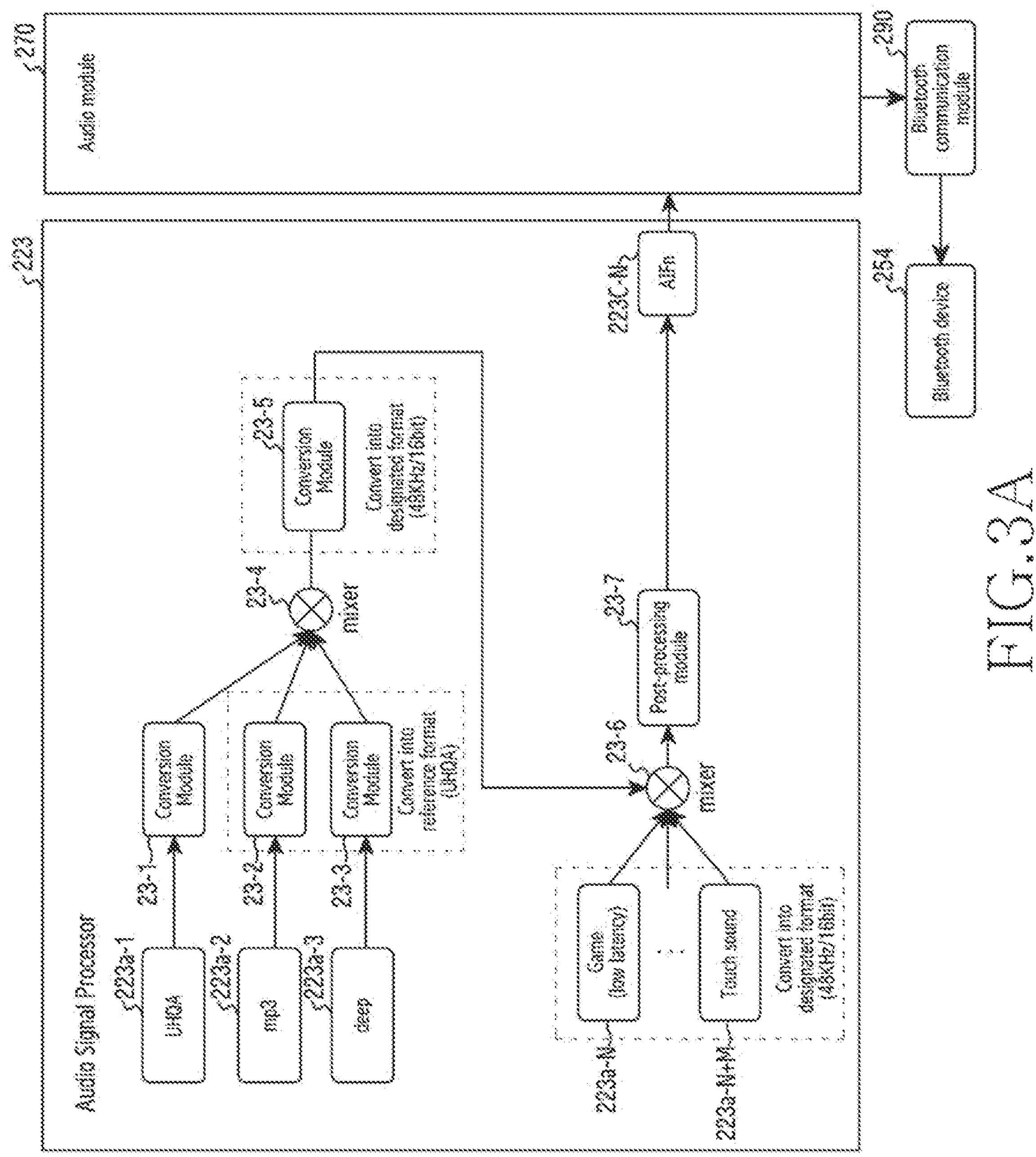
FIG. 3A is a diagram illustrating a configuration of an audio signal processor when audio data is output through a Bluetooth device according to an embodiment of the disclosure.

FIG. 3A is a diagram illustrating a configuration of an audio signal processor when audio data is output through a Bluetooth device according to an embodiment of the disclosure.

Referring to FIG. 3A, the electronic device 201 according to an embodiment of the disclosure may be configured to, when a Bluetooth device (e.g., a Bluetooth ear set, a Bluetooth headset, or a Bluetooth speaker) is connected thereto, output audio data to the Bluetooth device automatically or according to a user's request.

According to an embodiment, when the audio signal processor 223 is configured to output audio data through a Bluetooth device, the audio signal processor may configure multiple modules as shown in FIG. 3A, based on configuration information received from the main processor 221. According to some embodiments, the main processor 221 (or the processor 220) may configure the audio signal processor 223 to have the configuration as shown in FIG. 3A, based on the configuration information. The configuration information may define how to connect (or configure) at least a part of multiple internal configurations (e.g., at least one node, at least one mixing module, at least one conversion module, at least one post-processing module, and/or at least one audio interface) included in the audio signal processor 223, based on the type of a sound output device determined (selected) to output audio data.

The audio signal processor 223 configured as shown in FIG. 3A may receive at least one piece of first audio data and at least one piece of second audio data. Although not limited thereto, the at least one piece of first audio data may include game-related audio data (hereinafter, (1-1)th audio data) received through the Nth node 223*a*-N and/or touch sound and/or notification sound-related audio data (hereinafter, (1-2)th audio data) received through an (N+M)th node 223*a*-N+M, and the at least one piece of second audio data may include UHQA audio data (hereinafter, (2-1)th audio data) received through the first node 223*a*-1, mp3 audio data (hereinafter, (2-2)th audio data) received through the second node 223*a*-2, and/or deep audio data (hereinafter, (2-3)th audio data) received through the third node 223*a*-3. The at least one piece of first audio data may have a designated format (e.g., a format (e.g., 48 Khz 16 bits) supported by a Bluetooth device), and the at least one piece of second audio data may have a format (e.g., 384 kHz 32 bits, 44.1 kHz 16 bits, or 192 kHz 24 bits) different from the designated format.

According to an embodiment, the first audio data may be audio data requiring low latency. The audio data requiring low latency may include, for example, touch sound-related audio data, notification sound-related audio data, game-related audio data, virtual reality-related audio data, and augmented reality-related audio data.

According to an embodiment, the audio signal processor 223 may convert and/or mix at least one piece of second audio data. For example, when multiple pieces of second audio data have different formats, the audio signal processor 223 may identify a sampling rate and/or the number of bits of each of the multiple pieces of second audio data, determine (select) the highest sampling rate (e.g., 384 Khz) and/or the number of bits (e.g., 32 bits) as a reference format, convert the multiple pieces of second audio data to have the reference format through a first conversion module to a third conversion module 23-1, 23-2, and 23-3, and mix the audio data converted into the reference format through a first mixing module 23-4. To this end, the first to the third node 223*a*-1, 223*a*-2, and 223*a*-3 may be connected to the first conversion module to the third conversion module 23-1, 23-2, and 23-3, respectively, and the first conversion module to the third conversion module 23-1, 23-2, and 23-3 may be connected to the first mixing module 23-4. The first conversion module to the third conversion module 23-1, 23-2, and 23-3 may include a sample rate convert (SRC). The first mixing module 23-4 may be a hardware module or a software module.

According to some embodiments, the audio signal processor 223 may omit an operation of conversion into the reference format when the multiple pieces of second audio data have the same format, and mix the multiple pieces of second audio data through the first mixing module 23-4. According to another embodiment, when one piece of first audio data is received, the audio signal processor 223 may omit conversion and mixing.

According to an embodiment, the audio signal processor 223 may convert the audio data mixed through the first mixing module 23-4 into a designated format (e.g., 48 Khz 16 bits) through a fourth conversion module 23-5.

According to an embodiment, the audio signal processor 223 may mix the audio data converted into the designated format through the fourth conversion module 23-5 and the at least one piece of first audio data having the designated format through a second mixing module 23-6. The second mixing module 23-6 may be a hardware module or a software module.

According to an embodiment, the audio signal processor 223 may post-process the audio data mixed through the second mixing module 23-6 through a post-processing module 23-7. The post-processing module 23-7 may include an advanced audio distribution profile (A2DP) encoder according to an audio profile of Bluetooth.

According to an embodiment, the audio signal processor 223 may transmit the post-processed audio data to the audio module 270 through the Nth audio interface 223*c*-N.

The configurations (the first node 223*a*-1 to the (N+M)th node 223*a*-N+M, the first conversion module 23-1 to the fourth conversion module 23-5, and the post-processing module 23-7) included in the audio signal processor 223 may be a hardware module or a software module.

The electronic device according to an embodiment of the disclosure described above may reduce output latency since first audio data having the same format as a format supported by a sound output device (e.g., a Bluetooth device) may be transmitted to the sound output device without passing through a conversion module. For example, when the electronic device according to an embodiment of the disclosure is configured to output audio data through a Bluetooth device, the electronic device may have the same format as the Bluetooth device and may reduce output latency for game-related audio data and/or touch sound-related audio data requiring low latency. The electronic device according to an embodiment of the disclosure may reduce the latency of about 60 ms since audio data does not go through primary conversion and secondary conversion unlike the prior art.

Figure 3B:
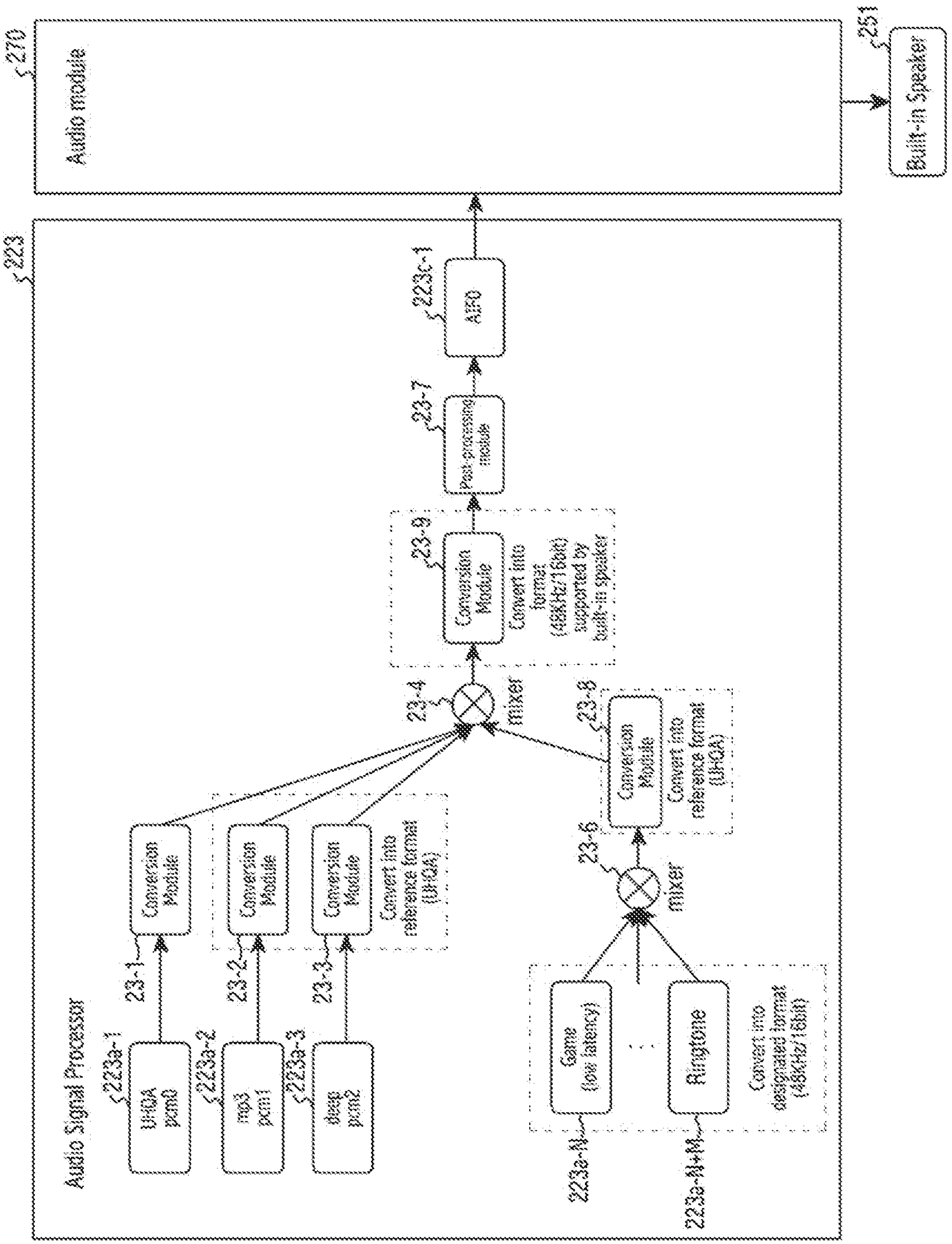
FIG. 3B is a diagram illustrating a configuration of an audio signal processor when audio data is output through a built-in speaker according to an embodiment of the disclosure.

FIG. 3B is a diagram illustrating a configuration of an audio signal processor when audio data is output through a built-in speaker according to an embodiment of the disclosure.

Referring to FIG. 3B, the electronic device 201 according to an embodiment of the disclosure may be configured to output audio data through a built-in speaker in response to a user's request when an external sound output device is not connected or even when the external sound output device is connected.

According to an embodiment, when the electronic device is configured to output audio data through the built-in speaker, the audio signal processor 223 may configure multiple modules as shown in FIG. 3B, based on configuration information received from the main processor 221. According to some embodiments, the main processor 221 (or the processor 220) may configure the audio signal processor 223 to have the configuration as shown in FIG. 3B, based on the configuration information.

According to an embodiment, the audio signal processor 223 may mix at least one piece of first audio data received through the Nth node 223*a*-N to the (N+M)th node 223*a*-N+M, through the second mixing module 23-6, and convert the mixed audio data into a reference format through a fifth conversion module 23-8.

According to an embodiment, the audio signal processor 223 may convert at least one piece of second audio data received through the first node 223*a*-1 to the third node 223*a*-3 into a reference format through the first conversion module 23-1 to the third conversion module 23-3, respectively.

According to an embodiment, the audio signal processor 223 may mix, through the first mixing module 23-4, the second audio data converted into the reference format and the audio data converted into the reference format through the fifth conversion module 23-8.

According to an embodiment, the audio signal processor 223 may convert the audio data mixed through the first mixing module 23-4 into a format (e.g., 48 kHz 24 bits) supported by the built-in speaker through a sixth conversion module 23-9, and post-process the converted audio data through the post-processing module 23-7. The post-processing module 23-7 may include an interpolation module and/or a filter for improving sound quality by attenuating noise or echo.

According to an embodiment, the audio signal processor 223 may transmit the post-processed audio data to the audio module 270 through the first audio interface 223*c*-1.

Figure 3C:
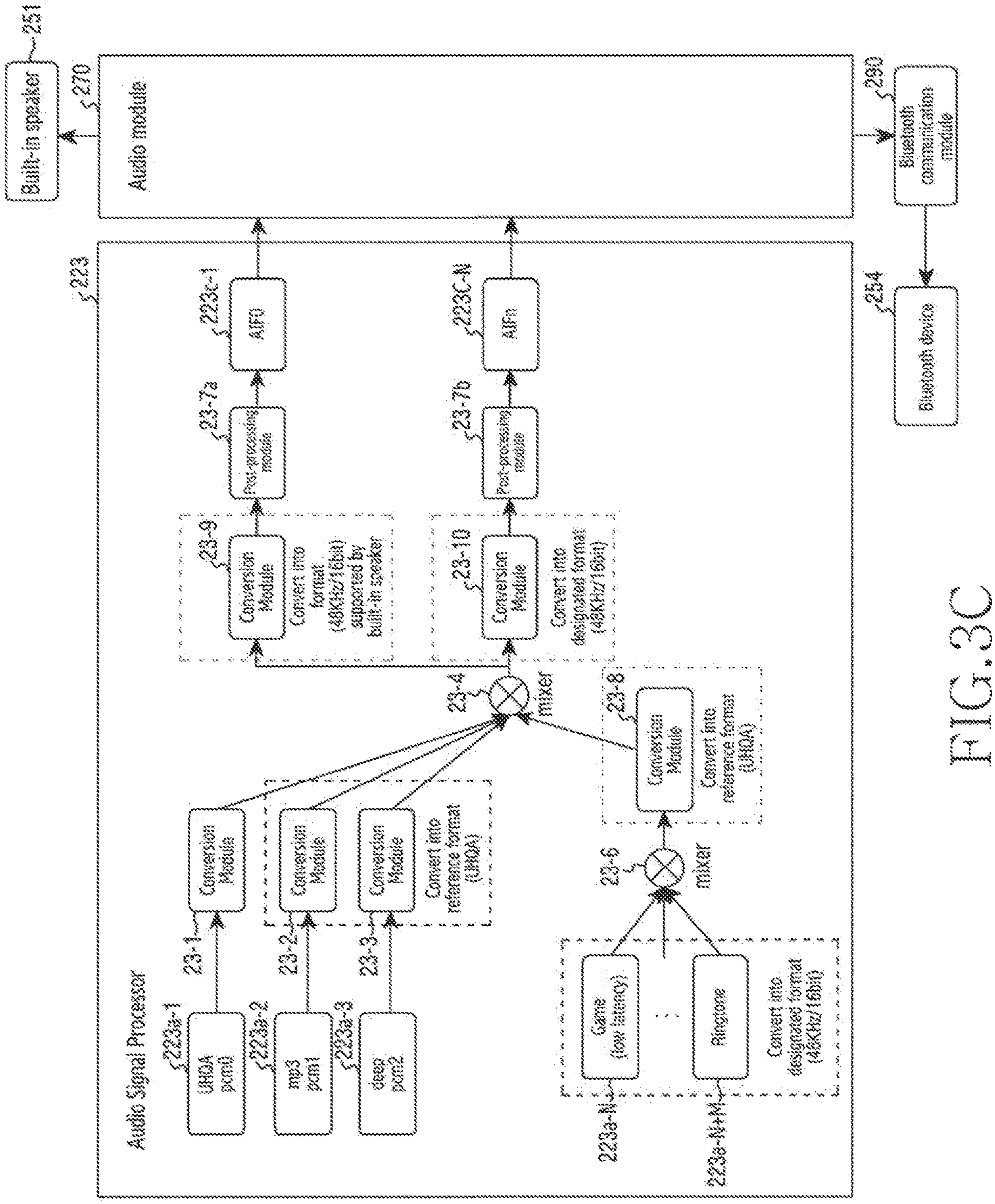
FIG. 3C is a diagram illustrating a configuration of an audio signal processor when audio data is output through a Bluetooth device and a built-in speaker according to an embodiment of the disclosure.

FIG. 3C is a diagram illustrating a configuration of an audio signal processor when audio data is output through a Bluetooth device and a built-in speaker according to an embodiment of the disclosure.

Referring to FIG. 3C, the electronic device 201 according to an embodiment of the disclosure may be configured to, when a Bluetooth device is connected thereto, output all audio data or some designated audio data (e.g., call reception sound or text reception sound) through the Bluetooth device and a built-in speaker.

According to an embodiment, when the electronic device is configured to output audio data through the Bluetooth device and the built-in speaker, the audio signal processor 223 may configure multiple modules as shown in FIG. 3C, based on configuration information received from the main processor 221. According to some embodiments, the main processor 221 (or the processor 220) may configure the audio signal processor 223 to have the configuration as shown in FIG. 3C, based on the configuration information.

According to an embodiment, when the electronic device is configured to output audio data through the Bluetooth device and the built-in speaker, the audio signal processor 223 may mix at least one piece of first audio data received through the Nth node 223*a*-N to the (N+M)th node 223*a*-N+M, through the second mixing module 23-6, and convert the mixed audio data into a reference format through the fifth conversion module 23-8.

According to an embodiment, the audio signal processor 223 may convert at least one piece of second audio data received through the first node 223*a*-1 to the third node 223*a*-3 into a reference format through the first conversion module 23-1 to the third conversion module 23-3, respectively.

According to an embodiment, the audio signal processor 223 may mix, through the first mixing module 23-4, the audio data converted into the reference format through the first conversion module 23-1 to the third conversion module 23-3 and the audio data converted into the reference format through the fifth conversion module 23-8.

According to an embodiment, the audio signal processor 223 may convert the audio data mixed through the first mixing module 23-4 into a format (e.g., 48 kHz 24 bits) supported by the built-in speaker, through the sixth conversion module 23-9, and post-process the converted audio data through a post-processing module 23-7*a* to be output through the built-in speaker.

According to an embodiment, the audio signal processor 223 may convert the audio data mixed through the first mixing module 23-4 into a format (e.g., 48 kHz 16 bits) supported by the Bluetooth device through a seventh conversion module 23-10, and post-process the converted audio data through a post-processing module 23-7*b* to be output through the Bluetooth device.

Figure 4A:
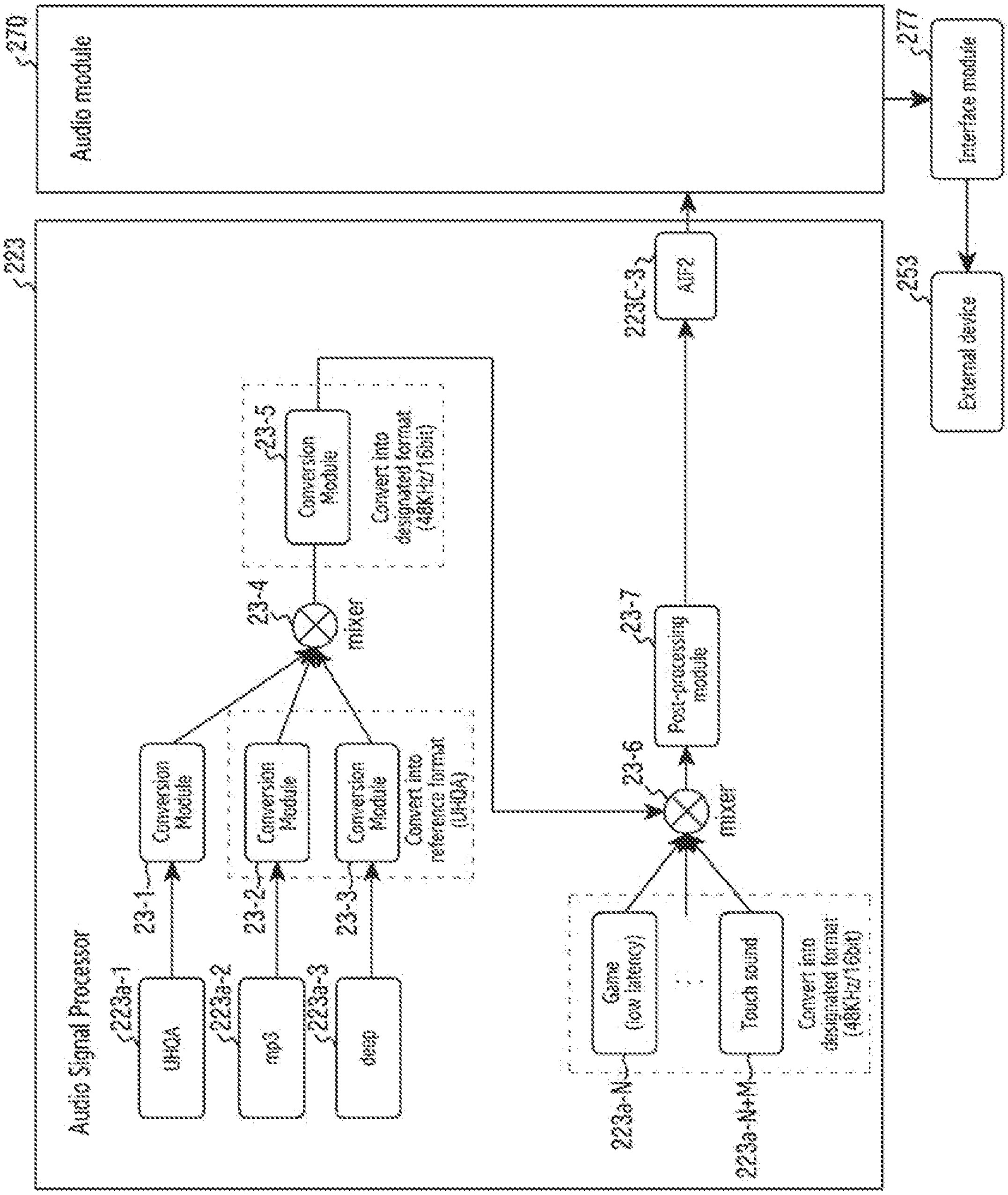
FIG. 4A is a diagram illustrating a configuration of an audio signal processor when audio data is output through an external speaker according to an embodiment of the disclosure.
Figure 4B:
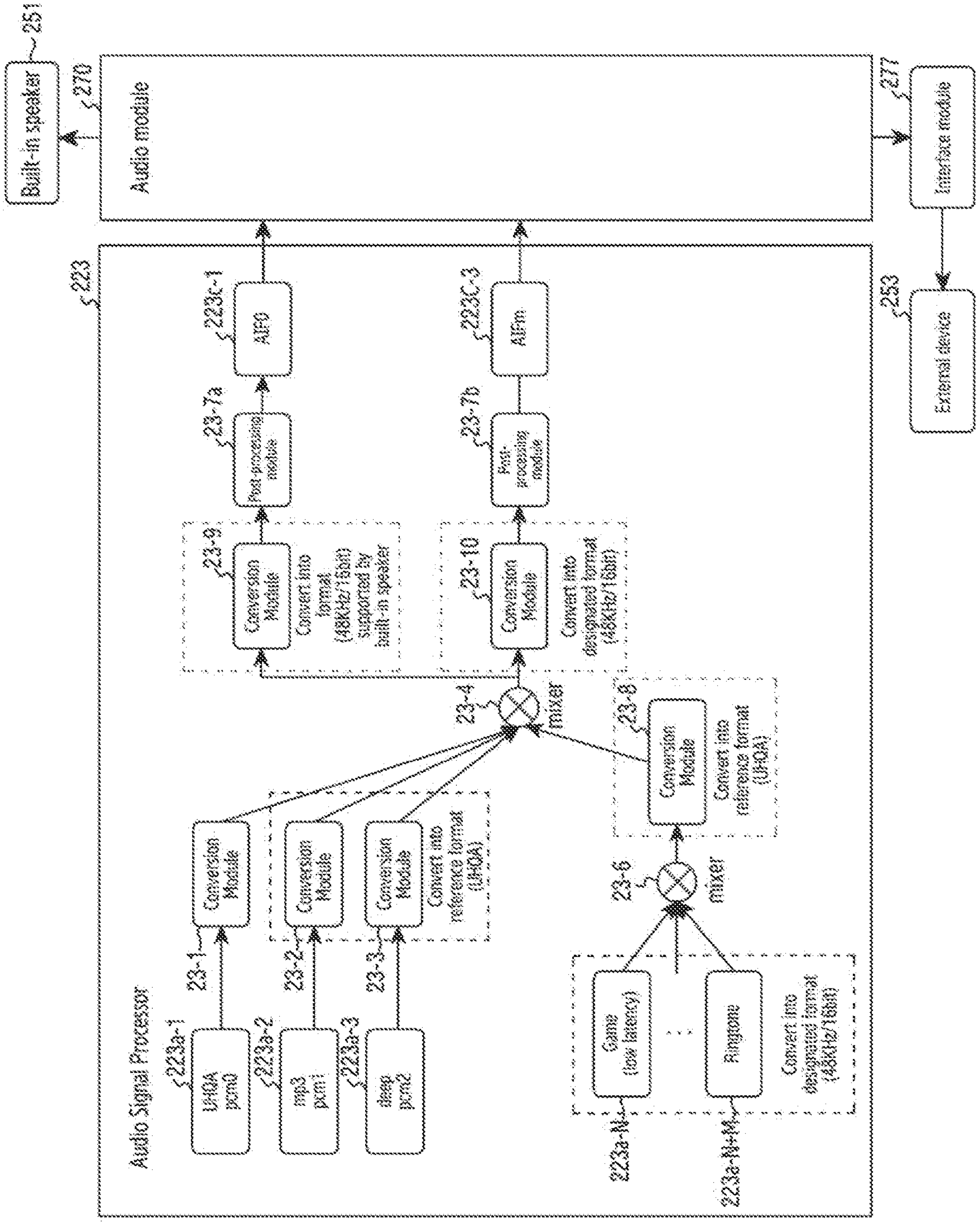
FIG. 4B is a diagram illustrating a configuration of an audio signal processor when audio data is output through an external speaker and a built-in speaker according to an embodiment of the disclosure.

FIG. 4A is a diagram illustrating a configuration of an audio signal processor when audio data is output through an external device according to an embodiment of the disclosure, and FIG. 4B is a diagram illustrating a configuration of an audio signal processor when audio data is output through an external device and a built-in speaker according to an embodiment of the disclosure.

Referring to FIGS. 4A and 4B, an electronic device according to an embodiment of the disclosure may output audio data through the external device 253 (e.g., a speaker or an earphone) connected by wire (e.g., a USB or an ear jack). The external device 253 may support an audio output of the same format (e.g., 48 Khz 16 bits) as audio data (e.g., game-related audio data, virtual reality-related audio data, or augmented reality-related audio data) requiring low latency.

According to an embodiment, when the electronic device (e.g., the audio signal processor) is configured to output audio data through the external device 253, as shown in FIG. 4A, the electronic device may convert each of multiple pieces of second audio data into a reference format (hereinafter, first reference format audio data), mix the first reference format audio data and then convert the mixed first reference format audio data into a designated format, mix the converted audio data and at least one piece of first audio data having the designated format, post-process the mixed audio data, and transmit the post-processed audio data to the external device 253. The audio signal processor of FIG. 4A is similar to the audio signal processor of FIG. 3A except for outputting audio data to the external device 253 instead of a Bluetooth device, and thus the detailed description thereof will be omitted.

According to an embodiment, when the electronic device (e.g., the audio signal processor) is configured to output audio data through the built-in speaker 251, the electronic device may operate in the same manner as in FIG. 3B. Accordingly, the detailed description thereof will be omitted.

According to an embodiment, when the electronic device (e.g., the audio signal processor) is configured to output audio data through the built-in speaker 251 and the external device 253, as shown in FIG. 4B, the electronic device may convert each of multiple pieces of second audio data into a reference format (hereinafter, first reference format audio data), mix multiple pieces of first audio data (hereinafter, first mixing data), convert the first mixing data into the reference format (hereinafter, first reference format audio data) and then mix the first reference format audio data and second reference format audio data (hereinafter, second mixing audio data), convert the second mixing audio data into a format (e.g., 48 Khz 24 bits) supported by the built-in speaker 251, post-process the converted audio data to transmit the post-processed audio data to the built-in speaker 251, convert the second mixing audio data into a format (e.g., 48 Khz 16 bits) supported by the external device 253, and post-process the converted audio data to transmit the post-processed audio data to the external device 253. The audio signal processor of FIG. 4B is similar to the audio signal processor of FIG. 3C except for outputting audio data to the external device 253 instead of a Bluetooth device, and thus the detailed description thereof will be omitted.

Figure 5:
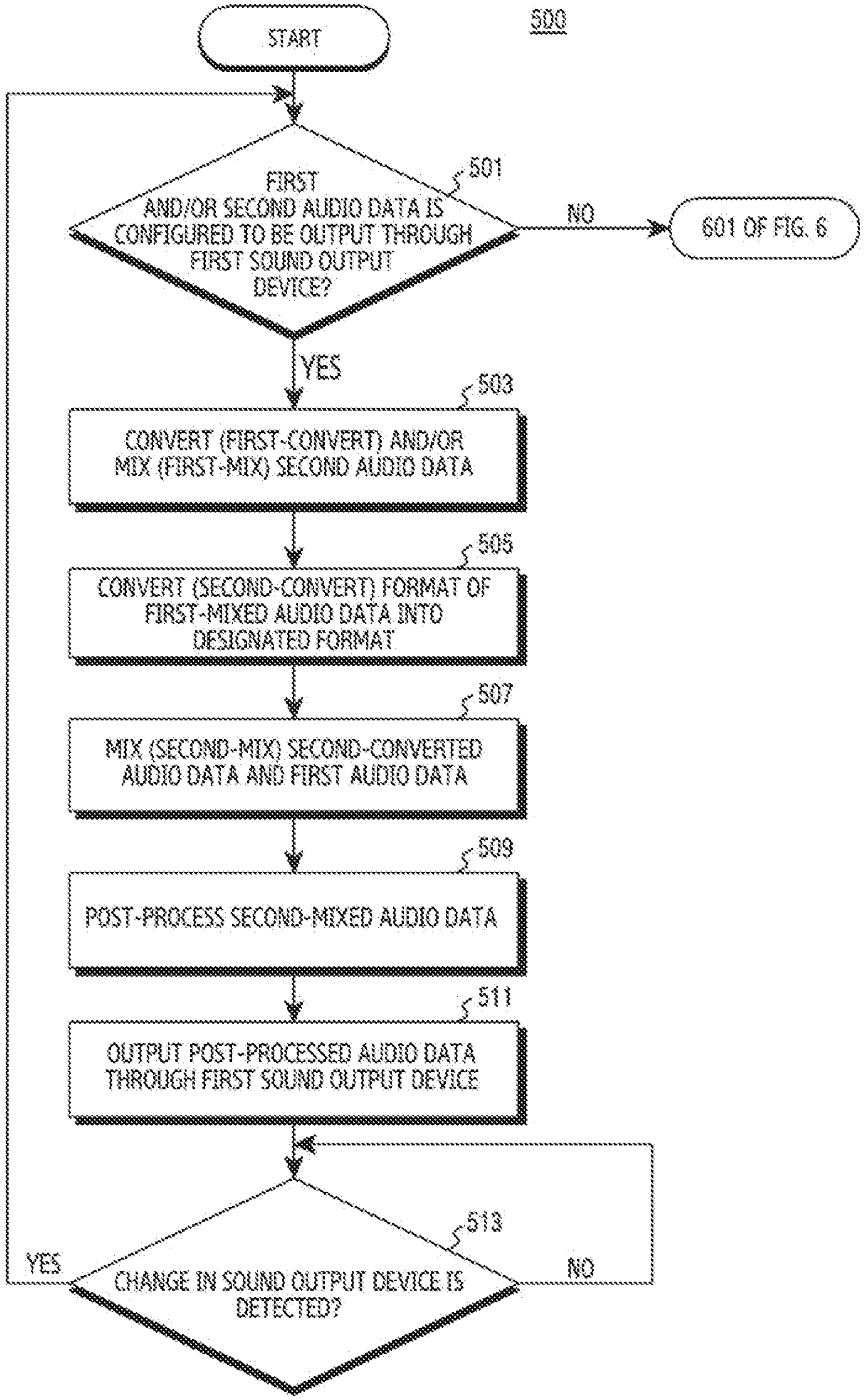
FIG. 5 is a flowchart illustrating a method for outputting audio data through an external sound output device of an electronic device according to an embodiment of the disclosure.

FIG. 5 is a flowchart 500 illustrating a method for outputting audio data through an external sound output device of an electronic device according to an embodiment of the disclosure.

Referring to FIG. 5, in operation 501, a processor (e.g., the processor 120 of FIG. 1 or the processor 220 of FIG. 2) of an electronic device (e.g., the electronic device 101 of FIG. 1 or the electronic device 201 of FIG. 2) according to an embodiment of the disclosure may identify whether the processor is configured to output at least one piece of first audio data having a designated format and/or at least one piece of second audio data having a format different from the designated format through a first sound output device (or an external sound output device) (e.g., the external device 253 (e.g., a wired earphone or a USB speaker) or the Bluetooth device 254). For example, when an output of audio data is requested, the processor (e.g., the main processor 221) may identify a sound output device which is configured to output the audio data, among multiple sound output devices. The designated format may be a format supported by the first sound output device. According to an embodiment, the processor (e.g., the main processor 221) may be configured to output audio data through the first sound output device when the first sound output device is connected by wire (e.g., the external device 253 is connected) or is connected wirelessly (e.g., the Bluetooth device 254 is connected).

As the identification result of operation 501, when the processor is not configured to output audio data through the first sound output device, the processor may proceed to operation 601 of FIG. 6 to be described later. On the other hand, as the identification result of operation 501, when the processor is configured to output audio data through the first sound output device, in operation 503, the processor (e.g., the audio signal processor 223) may convert (hereinafter, first-convert) and mix (hereinafter, first-mix) the at least one piece of second audio data. For example, the processor may identify a format of each of multiple pieces of second audio data when the multiple pieces of second audio data are received, determine the highest sampling rate and the number of bits as a reference format, and convert (first-convert) the format of each of the multiple pieces of second audio data into the reference format. According to an embodiment, the first-conversion of audio data having the reference format among the multiple pieces of second audio data may be omitted. As another example, when the multiple pieces of second audio data have the same format, the first-conversion may be omitted and only the first-mixing may be performed. As another example, when one piece of second audio data exists, the first-conversion and the first-mixing may be omitted.

According to an embodiment, in operation 505, the processor (e.g., the audio signal processor 223) may convert (second-convert) a format of the first-mixed audio data into the designated format.

According to an embodiment, in operation 507, the processor (e.g., the audio signal processor 223) may mix (hereinafter, second-mix) the second-converted audio data and the at least one piece of first audio data.

According to an embodiment, in operation 509, the processor (e.g., the audio signal processor 223) may post-process (e.g., encode, filter, and/or amplify) the second-mixed audio data. For example, the processor may encode the second-mixed audio data when the first sound output device is the Bluetooth device, and when the first sound output device is an external speaker, the processor may filter and amplify the second-mixed audio data, so as to improve sound quality.

According to an embodiment, in operation 511, the processor (e.g., the audio signal processor 223) may output the post-processed audio data through the first sound output device. For example, the processor may transmit the post-processed audio data to an audio module (e.g., the audio module 270) through an audio interface corresponding to the first sound output device so that the post-processed audio data is output through the first sound output device.

According to an embodiment, in operation 513, the processor (e.g., the main processor 221) may identify whether a change in a sound output device is detected. For example, the processor may identify whether the connection of the first sound output device is disconnected or whether audio data is requested to be output through a built-in speaker by a user while the first sound output device is connected.

When the change in the sound output device is not detected as the identification result of operation 513, the processor (e.g., the main processor 221) may maintain operation 513. On the other hand, when the change in the sound output device is detected as the identification result of operation 513, the processor (e.g., the main processor 221) may return to operation 501.

Figure 6:
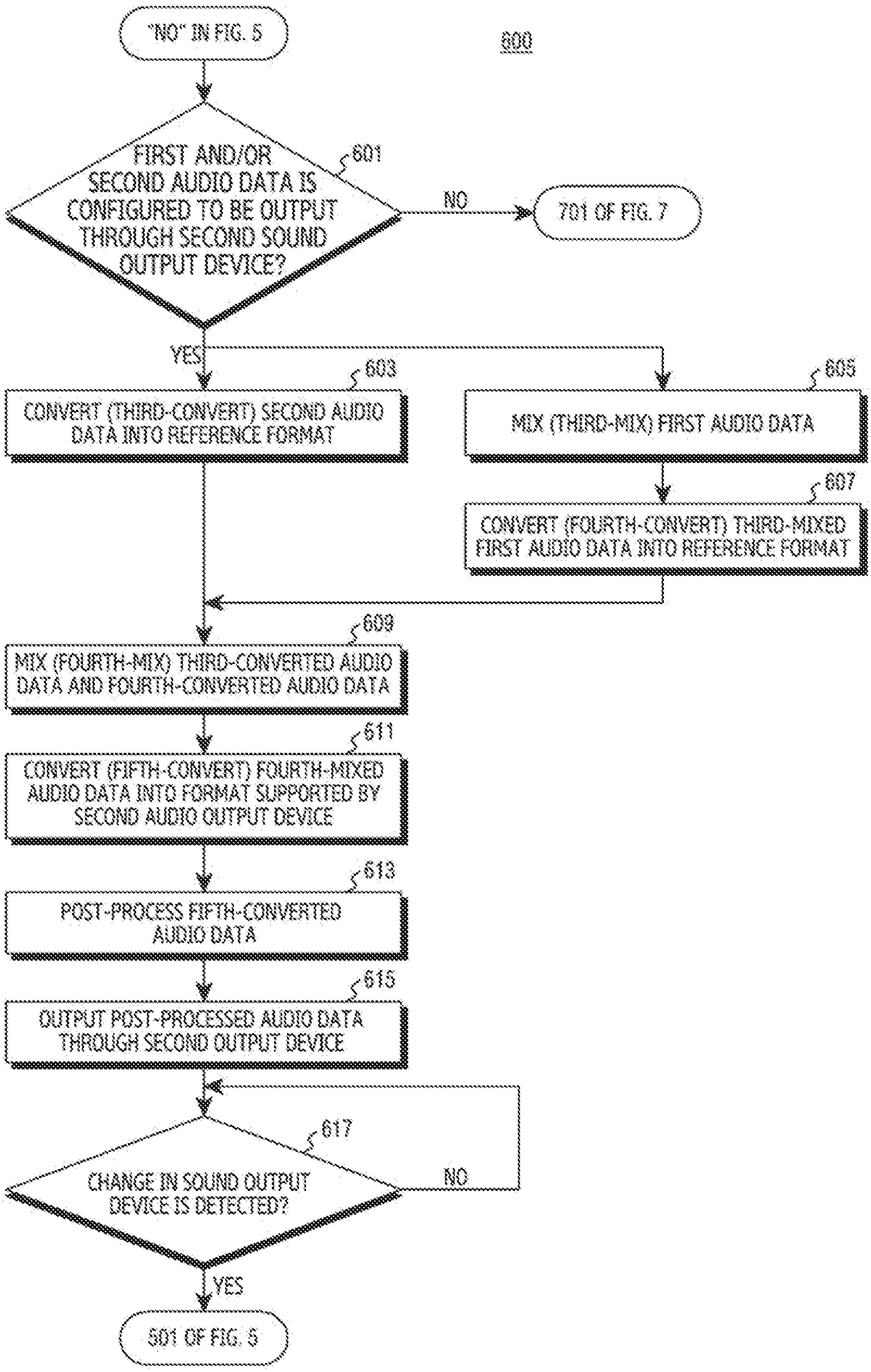
FIG. 6 is a flowchart illustrating a method for outputting audio data through an internal sound output device of an electronic device according to an embodiment of the disclosure.

FIG. 6 is a flowchart 600 illustrating a method for outputting audio data through an internal sound output device of an electronic device according to an embodiment of the disclosure.

Referring to FIG. 6, in operation 601, a processor (e.g., the processor 120 of FIG. 1 or the processor 220 of FIG. 2) of an electronic device (e.g., the electronic device 101 of FIG. 1 or the electronic device 201 of FIG. 2) according to an embodiment of the disclosure may identify whether the processor is configured to output at least one piece of first audio data having a designated format and/or at least one piece of second audio data having a format different from the designated format through a second sound output device (or an internal sound output device) (e.g., a built-in speaker). For example, when an output of audio data is requested, the processor (e.g., the main processor 221) may identify a sound output device which is configured to output the audio data, among multiple sound output devices. The designated format may be a format supported by a first sound output device(or a second sound output device). According to an embodiment, the processor (e.g., the main processor 221) may be configured to output audio data through the second sound output device when an external sound output device is not connected. According to an embodiment, the processor may be configured to output audio data through the second sound output device according to a user's request even when an external sound output device is connected.

As the identification result of operation 601, when the processor is not configured to output audio data through the second sound output device, the processor may proceed to operation 701 of FIG. 7 to be described later. On the other hand, as the identification result of operation 601, when the processor is configured to output audio data through the second sound output device, in operation 603, the processor (e.g., the audio signal processor 223) may convert (hereinafter, third-convert) the at least one piece of second audio data. For example, the processor may identify a format of each of multiple pieces of second audio data when the multiple pieces of second audio data are received, determine the highest sampling rate and the number of bits as a reference format, and convert the format of each of the multiple pieces of second audio data into the reference format. According to an embodiment, the third-conversion of audio data having the reference format among the multiple pieces of second audio data may be omitted. As another example, when the multiple pieces of second audio data have the same format or one piece of second audio data is received, the third-conversion may be omitted, and the same format or a format of the one piece of second audio data may be the reference format.

According to an embodiment, in operation 605, the processor (e.g., the audio signal processor 223) may mix (third-mix) the at least one piece of first audio data. According to some embodiments, when one piece of first audio data exists, operation 605 may be omitted.

According to an embodiment, in operation 607, the processor (e.g., the audio signal processor 223) may convert (hereinafter, fourth-convert) a format of the third-mixed audio data into the designated format.

According to an embodiment, in operation 609, the processor (e.g., the audio signal processor 223) may mix (hereinafter, fourth-mix) the third-converted audio data and the fourth-converted audio data.

According to an embodiment, in operation 611, the processor (e.g., the audio signal processor 223) may convert (fifth-convert) the fourth-mixed audio data into a format supported by the second sound output device.

According to an embodiment, in operation 613, the processor (e.g., the audio signal processor 223) may post-process the fifth-converted audio data. For example, the processor may filter and amplify the fifth-converted audio data so as to improve sound quality.

According to an embodiment, in operation 615, the processor (e.g., the audio signal processor 223) may output the post-processed audio data through the second sound output device. For example, the processor may transmit the post-processed audio data to an audio module (e.g., the audio module 270) through an audio interface corresponding to the second sound output device so that the post-processed audio data is output through the second sound output device.

According to an embodiment, in operation 617, the processor (e.g., the main processor 221) may identify whether a change in a sound output device is detected. For example, the processor may identify whether the first sound output device is connected.

When the change in the sound output device is not detected as the identification result of operation 617, the processor (e.g., the main processor 221) may maintain operation 617. On the other hand, when the change in the sound output device is detected as the identification result of operation 617, the processor (e.g., the main processor 221) may return to operation 501 of FIG. 5.

Figure 7:
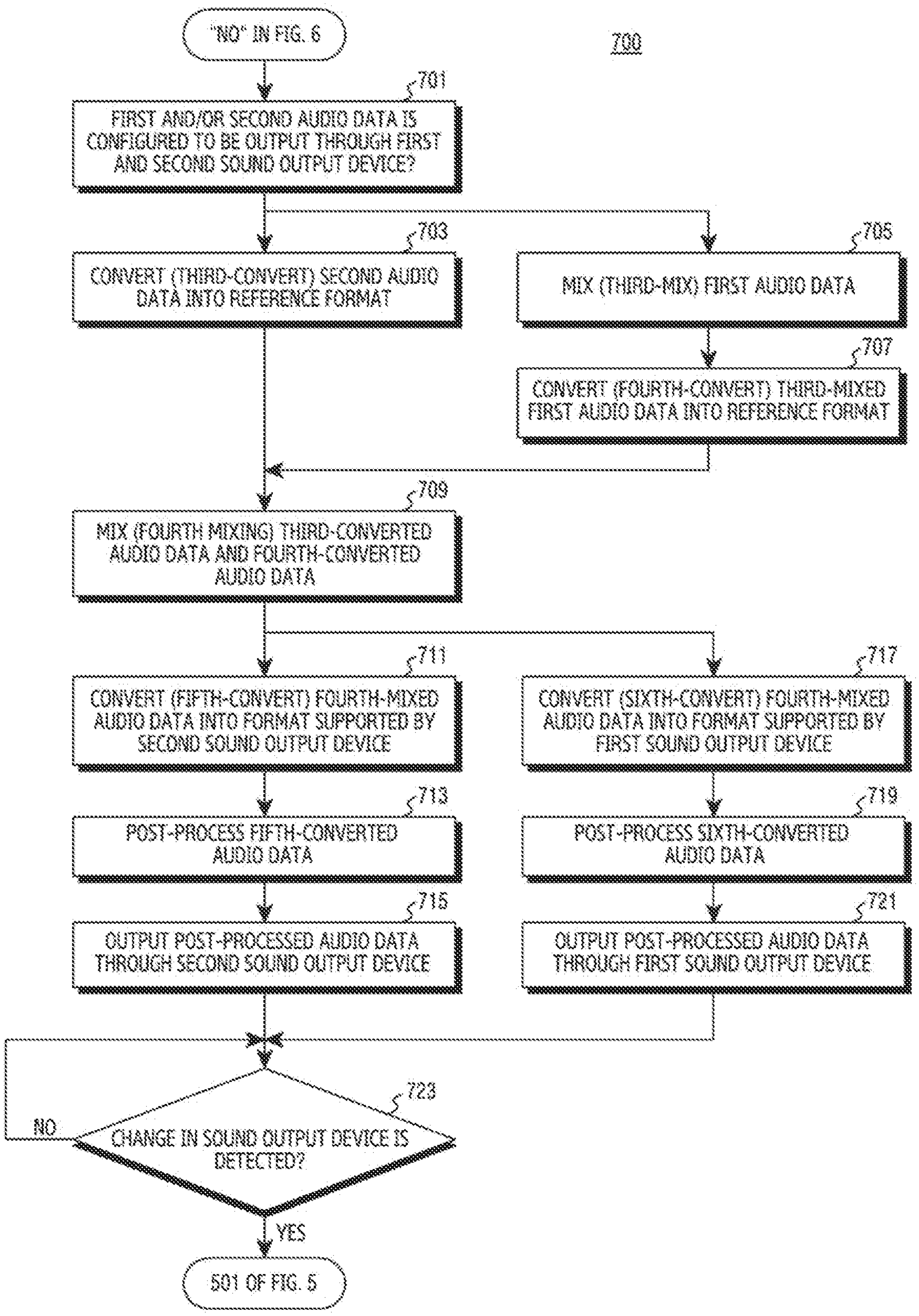
FIG. 7 is a flowchart illustrating a method for outputting audio data through an external sound output device and an internal sound output device of an electronic device according to an embodiment of the disclosure.

FIG. 7 is a flowchart 700 illustrating a method for outputting audio data through an external sound output device and an internal sound output device of an electronic device according to an embodiment of the disclosure.

Referring to FIG. 7, in operation 701, a processor (e.g., the processor 120 of FIG. 1 or the processor 220 of FIG. 2) of an electronic device (e.g., the electronic device 101 of FIG. 1 or the electronic device 201 of FIG. 2) according to an embodiment of the disclosure may be configured to output at least one piece of first audio data having a designated format and/or at least one piece of second audio data having a format different from the designated format through a first sound output device (an external sound output device) (e.g., a Bluetooth device or an external speaker) and a second sound output device (or an internal sound output device) (e.g., a built-in speaker). According to an embodiment, the processor (e.g., the main processor 221) may be configured to output designated audio data (e.g., ringtone and alarm sound (text reception sound and push message reception sound)) through the first and the second sound output device when the first sound output device is connected.

According to an embodiment, operations 703 to 715 of FIG. 7 are similar to operations 603 to 615 of FIG. 6, and thus the detailed descriptions thereof will be omitted.

According to an embodiment, in operation 717, the processor (e.g., the audio signal processor 223) may convert (sixth-convert) the fourth-mixed audio data into a format supported by the first sound output device.

According to an embodiment, in operation 719, the processor (e.g., the audio signal processor 223) may post-process the sixth-converted audio data. For example, the processor may encode the sixth-converted audio data.

According to an embodiment, in operation 721, the processor (e.g., the audio signal processor 223) may output the post-processed audio data through the first sound output device. For example, the processor may transmit the post-processed audio data to an audio module (e.g., the audio module 270) through an audio interface corresponding to the first sound output device so that the post-processed audio data is output through the first sound output device.

According to an embodiment, in operation 723, the processor (e.g., the main processor 221) may identify whether a change in a sound output device is detected. For example, the processor may identify whether the connection of the first sound output device is disconnected or audio data is configured to be output through the second sound output device by a user.

When the change in the sound output device is not detected as the identification result of operation 723, the processor (e.g., the main processor 221) may maintain operation 723. On the other hand, when the change in the sound output device is detected as the identification result of operation 723, the processor (e.g., the main processor 221) may return to operation 501 of FIG. 5.

Although the audio signal processor 223 has been described as being included in the processors 120 and 220, the audio signal processor 223 may be included in the audio modules 170 and 270 or may be included as a separate configuration.

An electronic device (e.g., the electronic device 101 or 201) according to various embodiments of the disclosure may include: an audio module (e.g., the audio module 170 or 270) configured to output, to at least one of multiple sound output devices (e.g., the built-in speaker 251, the receiver 252, the external device 253, and the Bluetooth device 254), at least one of at least one piece of first audio data having a designated format or at least one piece of second audio data having a format different from the designated format; a processor (e.g., the processor 120 or 220) operatively connected to the audio module; and a memory (e.g., the memory 130 or 230) operatively connected to the processor, wherein the memory stores instructions which, when executed, cause the processor to, in response to being configured to output at least one of the at least one piece of first audio data or the at least one piece of second audio data through a first sound output device (e.g., the external device 253 or the Bluetooth device 254) configured to output audio data having the designated format, mix (hereinafter, first-mix) the at least one piece of second audio data, convert the first-mixed audio data into the designated format, mix (hereinafter, second-mix) the at least one piece of first audio data and the audio data converted into the designated format, post-process the second-mixed audio data, and transmit the post-processed audio data to the audio module to be output through the first sound output device.

According to various embodiments, the processor may include a main processor (e.g., the main processor 121 or 221) and an audio signal processor (e.g., the coprocessor 123 or the audio signal processor 223). The main processor may transmit audio data having various formats to be output through the first sound output device to the audio signal processor, and the audio signal processor may perform at least one of format conversion, mixing, or post-processing on at least a part of the audio data having various formats received from the main processor, so as to transmit the audio data to the audio module.

According to various embodiments, the instruction configured to convert the first-mixed audio data into the designated format may include an instruction configured to convert a sampling rate of the first-mixed audio data into a sampling rate of the designated format.

According to various embodiments, the instruction configured to first-mix the at least one piece of second audio data may be omitted when the at least one piece of second audio data includes one piece of second audio data. As another example, the instruction configured to first-mix the at least one piece of second audio data may include an instruction configured to, when the at least one piece of second audio data includes multiple pieces of second audio data, identify a sampling rate of each of the multiple pieces of second audio data, determine the highest sampling rate as a reference sampling rate, convert a sampling rate of second audio data having the sampling rate different from the reference sampling rate among the multiple pieces of second audio data into the reference sampling rate, and then perform the first-mixing on the multiple pieces of second audio data.

According to various embodiments, the at least one piece of first audio data may include audio data requiring low latency.

According to various embodiments, the first sound output device may include a wireless sound output device (e.g., the Bluetooth device 254) connected to the electronic device via short-range wireless communication or a wired sound output device (e.g., the external device 253) connected to the electronic device via wired communication.

According to various embodiments, the short-range wireless communication may include Bluetooth communication, and the post-processing may include encoding.

According to various embodiments, the memory may further store instructions which, when executed, cause the processor to, in response to being configured to output at least one of the at least one piece of first audio data or the at least one piece of second audio data through a second sound output device (e.g., the built-in speaker 251), mix (hereinafter, third-mix) the at least one piece of first audio data, convert the third-mixed audio data into a reference format, convert the at least one piece of second audio data into the reference format, mix (hereinafter, fourth-mix) the audio data converted into the reference format, post-process the fourth-mixed audio data, and transmit the post-processed audio data to the audio module to be output through the second sound output device.

According to various embodiments, the memory may further store instructions which, when executed, cause the processor to convert the fourth-mixed audio data into a format supported by the second sound output device before performing the post-processing when the reference format is different from the format supported by the second sound output device.

According to various embodiments, the memory may further store instructions which, when executed, cause the processor to, in response to being configured to output at least one of the at least one piece of first audio data or the at least one piece of second audio data through the first sound output device and the second sound output device, mix (hereinafter, fifth-mix) the at least one piece of first audio data, convert the fifth-mixed audio data into a reference format, convert the at least one piece of second audio data into the reference format, mix (hereinafter, sixth-mix) the audio data converted into the reference format, convert the sixth-mixed audio data into a format supported by the first sound output device and then encode the converted audio data, and transmit the encoded audio data to the audio module to be output through the first sound output device, and convert the sixth-mixed audio data into a format supported by the second sound output device and then post-process the converted audio data, and transmit the post-processed audio data to the audio module to be output through the second sound output device.

A method for outputting audio data of an electronic device (e.g., the electronic device 101 or 201) according to various embodiments of the disclosure may include: in response to being configured to output at least one of at least one piece of first audio data having a designated format or at least one piece of second audio data having a format different from the designated format through a first sound output device (e.g., the external device 253 or the Bluetooth device 254) configured to output audio data having the designated format, mixing (hereinafter, first-mixing) the at least one piece of second audio data; converting the first-mixed audio data into the designated format; mixing (hereinafter, second-mixing) the at least one piece of first audio data and the audio data converted into the designated format; post-processing the second-mixed audio data; and outputting the post-processed audio data through the first sound output device.

According to various embodiments, the converting of the first-mixed audio data into the designated format may include converting a sampling rate of the first-mixed audio data into a sampling rate of the designated format.

According to various embodiments, the first-mixing of the at least one piece of second audio data may include: omitting the first-mixing when the at least one piece of second audio data includes one piece of second audio data; or when the at least one piece of second audio data includes multiple pieces of second audio data, identifying a sampling rate of each of the multiple pieces of second audio data, determining the highest sampling rate as a reference sampling rate, converting a sampling rate of second audio data having the sampling rate different from the reference sampling rate among the multiple pieces of second audio data into the reference sampling rate, and then performing the first-mixing on the multiple pieces of second audio data.

According to various embodiments, the at least one piece of first audio data may include audio data requiring low latency.

According to various embodiments, the first sound output device may include a wireless sound output device (e.g., the Bluetooth device 254) connected to the electronic device via short-range wireless communication or a wired sound output device (e.g., the external device 253) connected to the electronic device via wired communication.

According to various embodiments, the short-range wireless communication may include Bluetooth communication, and the post-processing may include encoding the second-mixed audio data.

According to various embodiments, the method may further include: in response to being configured to output at least one of the at least one piece of first audio data or the at least one piece of second audio data through a second sound output device (e.g., the built-in speaker 251), mixing (hereinafter, third-mixing) the at least one piece of first audio data; converting the third-mixed audio data into a reference format; converting the at least one piece of second audio data into the reference format; mixing (hereinafter, fourth-mixing) the audio data converted into the reference format; post-processing the fourth-mixed audio data; and outputting the post-processed audio data through the second sound output device.

According to various embodiments, the method may further include converting the fourth-mixed audio data into a format supported by the second sound output device before performing the post-processing when the reference format is different from the format supported by the second sound output device.

According to various embodiments, the method may further include: in response to being configured to output at least one of the at least one piece of first audio data or the at least one piece of second audio data through the first sound output device and the second sound output device, mixing (hereinafter, fifth-mixing) the at least one piece of first audio data; converting the fifth-mixed audio data into a reference format; converting the at least one piece of second audio data into the reference format; mixing (hereinafter, sixth-mixing) the audio data converted into the reference format; converting the sixth-mixed audio data into a format supported by the first sound output device and then encoding the converted audio data; outputting the encoded audio data through the first sound output device; and converting the sixth-mixed audio data into a format supported by the second sound output device and then post-processing the converted audio data, and outputting the post-processed audio data through the second sound output device.

A non-transitory computer-readable recording medium according to various embodiments of the disclosure may store at least one instruction which, when executed by at least one processor (e.g., the processor 120 or 220), causes the at least one processor to: in response to being configured to output at least one of at least one piece of first audio data having a designated format or at least one piece of second audio data having a format different from the designated format through a first sound output device (e.g., the external device 253 or the Bluetooth device 254) configured to output audio data having the designated format, mix (hereinafter, first-mix) the at least one piece of second audio data; convert the first-mixed audio data into the designated format; mix (hereinafter, second-mix) the at least one piece of first audio data and the audio data converted into the designated format; post-process the second-mixed audio data; and output the post-processed audio data through the first sound output device.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

What is claimed is:

1. An electronic device comprising:
- an audio module configured to output, to at least one sound output device, at least one of at least one piece of first audio data having a designated format and at least one piece of second audio data having a format different from the designated format;
- at least one processor operatively connected to the audio module; and
- at least one memory operatively connected to the at least one processor and configured to store at least one instruction,
- wherein the at least one instruction, when executed by the at least one processor, causes the electronic device to:
  - generate first-mixed audio data by mixing the at least one piece of second audio data;
  - convert the first-mixed audio data into the designated format;
  - generate second-mixed audio data by mixing the at least one piece of first audio data and the first-mixed audio data converted into the designated format;
  - post-process the second-mixed audio data;
  - transmit the post-processed second-mixed audio data to the audio module; and
  - cause the audio module to output the post-processed second-mixed audio data through the at least one sound output device, and
- wherein the at least one instruction, when executed by the at least one processor, further causes the electronic device to:
  - determine whether the at least one piece of second audio data comprises a plurality of pieces of second audio data; and
  - based on determining that the at least one piece of second audio data comprises a plurality of pieces of second audio data, mix the plurality of pieces of second audio data to generate the first-mixed audio data.

2. The electronic device of claim 1, wherein the at least one processor comprises a main processor and an audio signal processor,
- wherein the at least one instruction, when executed by the main processor, causes the main processor to transmit audio data having various formats to the audio signal processor, and
- wherein the at least one instruction, when executed by the audio signal processor, causes the audio signal processor to generate processed audio data by performing at least one of format conversion, mixing, and post-processing to be performed on at least a part of the audio data having various formats received from the main processor, and to transmit the processed audio data to the audio module.

3. The electronic device of claim 1, wherein the at least one instruction, when executed by the at least one processor further causes the electronic device to convert the first-mixed audio data into the designated format by converting a sampling rate of the first-mixed audio data into a sampling rate of the designated format.

4. The electronic device of claim 1, wherein the at least one instruction, when executed by the at least one processor further causes the electronic device to:
- based on determining that the at least one piece of second audio data comprises a plurality of pieces of second audio data, first-mix the plurality of pieces of second audio data to generate the mixed audio data by:
  - identifying a sampling rate of each of the plurality of pieces of second audio data,
  - determining a highest sampling rate from among the identified sampling rates,
  - for each respective piece of second audio data of the plurality of pieces of second audio data with a respective sampling rate that is not equal to the highest sampling rate from among the identified sampling rates, convert the respective sampling rate of the respective piece of second audio data into the highest sampling rate from among the identified sampling rates, and
  - mixing the plurality of pieces of second audio data.

5. The electronic device of claim 1, wherein the at least one piece of first audio data comprises audio data requiring low latency.

6. The electronic device of claim 1, wherein the at least one sound output device comprises a wireless sound output device in communication with the electronic device via short-range wireless communication or a wired sound output device in communication with the electronic device via wired communication.

7. The electronic device of claim 6, wherein the short-range wireless communication comprises Bluetooth communication, and the post-processing of the second-mixed audio data comprises encoding.

8. The electronic device of claim 1, wherein the at least one instruction, when executed by the at least one processor, is-further causes the electronic device to:

generate third-mixed audio data by mixing the at least one piece of first audio data;

convert the third-mixed audio data into a reference format;

convert the at least one piece of second audio data into the reference format;

generate fourth-mixed audio data by mixing the third-mixed audio data converted into the reference format and the at least one piece of second audio data converted into the reference format;

post-process the fourth-mixed audio data;

transmit the post-processed fourth-mixed audio data to the audio module; and cause the audio module to output the post-processed fourth-mixed audio data through a second sound output device.

9. The electronic device of claim 8, wherein the at least one instruction, when executed by the at least one processor further causes the electronic device to:

determine whether the second sound output device supports the reference format, and based on determining that the second sound output device does not support the reference format, convert the fourth-mixed audio data into a format supported by the second sound output device.

10. The electronic device of claim 1, wherein the at least one instruction, when executed by the at least one processor further causes the electronic device to:

generate fifth-mixed audio data by mixing the at least one piece of first audio data;

convert the fifth-mixed audio data into a reference format;

convert the at least one piece of second audio data into the reference format;

generate sixth-mixed audio data by mixing the fifth-mixed audio data converted into the reference format and the at least one piece of second audio data converted into the reference format;

convert the sixth-mixed audio data into a format supported by the at least one sound output device, encode the converted sixth-mixed audio data, and cause the audio module to output the encoded audio data through the at least one sound output device; and convert the sixth-mixed audio data into a format supported by a second sound output device, post-process the converted sixth-mixed audio data, and cause the audio module to output the post-processed audio data through the second sound output device.

11. A method for outputting audio data of an electronic device, the method comprising:

generating first-mixed audio data by mixing at least one piece of second audio data;

converting the first-mixed audio data into a designated format;

generating second-mixed audio data by mixing at least one piece of first audio data and the first-mixed audio data converted into the designated format;

post-processing the second-mixed audio data; and outputting the post-processed second-mixed audio data through at least one sound output device, wherein the generating the first-mixed audio data by mixing the at least one piece of second audio data comprises:

determining whether the at least one piece of second audio data comprises a plurality of pieces of second audio data; and based on the determining that the at least one piece of second audio data comprises a plurality of pieces of second audio data, mixing the plurality of pieces of second audio data to generate the first-mixed audio data.

12. The method of claim 11, wherein the converting of the first-mixed audio data into the designated format comprises converting a sampling rate of the first-mixed audio data into a sampling rate of the designated format.

13. The method of claim 11, wherein the generating the first-mixed audio data by mixing the at least one piece of second audio data comprises:

based on the determining that the at least one piece of second audio data comprises a plurality of pieces of second audio data, mixing the plurality of pieces of second audio data to generate the first-mixed audio data by:

identifying a sampling rate of each of the plurality of pieces of second audio data, determining a highest sampling rate from among the identified sampling rates, for each respective piece of second audio data of the plurality of pieces of second audio data with a respective sampling rate that is not equal to the highest sampling rate from among the identified sampling rates, convert the respective sampling rate of the respective piece of second audio data into the highest sampling rate from among the identified sampling rates, and mixing the plurality of pieces of second audio data.

14. The method of claim 11, wherein the at least one piece of first audio data comprises audio data requiring low latency.

15. The method of claim 11, wherein the at least one sound output device comprises a wireless sound output device in communication with the electronic device via short-range wireless communication or a wired sound output device in communication with the electronic device via wired communication.

16. An electronic device comprising:

an audio module configured to output, to at least one sound output device, at least one of at least one piece of first audio data having a designated format and at least one piece of second audio data having a format different from the designated format;

at least one processor operatively connected to the audio module; and at least one memory operatively connected to the at least one processor and configured to store at least one instruction, wherein the at least one instruction, when executed by the at least one processor, causes the electronic device to:

generate first-mixed audio data by mixing the at least one piece of second audio data;

convert the first-mixed audio data into the designated format;

generate second-mixed audio data by mixing the at least one piece of first audio data and the first-mixed audio data converted into the designated format;

post-process the second-mixed audio data;

transmit the post-processed second-mixed audio data to the audio module; and cause the audio module to output the post-processed second-mixed audio data through the at least one sound output device, wherein the at least one processor comprises a main processor and an audio signal processor, wherein the at least one instruction, when executed by the main processor, causes the main processor to transmit audio data having various formats to the audio signal processor, and wherein the at least one instruction, when executed by the audio signal processor, causes the audio signal processor to generate processed audio data by performing at least one of format conversion, mixing, and post-processing to be performed on at least a part of the audio data having various formats received from the main processor, and to transmit the processed audio data to the audio module.

* * * * *